(12) United States Patent
Freeman et al.

(10) Patent No.: US 11,268,389 B2
(45) Date of Patent: Mar. 8, 2022

(54) BLISK BONDED CMC AIRFOIL HAVING ATTACHMENT

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); Aaron D. Sippel, Zionsville, IN (US); Bruce E. Varney, Greenwood, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 665 days.

(21) Appl. No.: 15/978,807

(22) Filed: May 14, 2018

(65) Prior Publication Data
US 2019/0345831 A1    Nov. 14, 2019

(51) Int. Cl.
*F01D 5/30* (2006.01)

(52) U.S. Cl.
CPC ......... *F01D 5/3061* (2013.01); *F01D 5/3007* (2013.01); *F05D 2220/32* (2013.01); *F05D 2230/236* (2013.01); *F05D 2230/237* (2013.01)

(58) Field of Classification Search
CPC .............. F01D 5/3061; F01D 5/3084; F05D 2230/237; F05D 2230/236
See application file for complete search history.

(56) References Cited

U.S. PATENT DOCUMENTS

| | | | |
|---|---|---|---|
| 4,152,816 A | 5/1979 | Ewing et al. | |
| 4,802,824 A | 2/1989 | Gastebois et al. | |
| 7,284,958 B2 * | 10/2007 | Dundas | F01D 5/3007 416/193 A |
| 8,123,487 B2 | 2/2012 | Bayer et al. | |
| 9,328,622 B2 * | 5/2016 | Garcia-Crespo | F01D 5/303 |
| 9,951,632 B2 * | 4/2018 | Waldman | F01D 11/006 |
| 10,119,408 B2 * | 11/2018 | Richter | B23K 26/32 |
| 10,280,768 B2 * | 5/2019 | Freeman | F01D 5/282 |
| 2011/0142639 A1 | 6/2011 | Campbell et al. | |
| 2011/0142684 A1 | 6/2011 | Campbell et al. | |
| 2011/0243746 A1 | 10/2011 | Liotta et al. | |
| 2014/0127026 A1 | 5/2014 | Farineau et al. | |
| 2016/0130957 A1 | 5/2016 | Freeman et al. | |
| 2016/0177748 A1 | 6/2016 | Walston et al. | |
| 2016/0186581 A1 | 6/2016 | Dierskmeier et al. | |
| 2016/0201483 A1 | 7/2016 | Engel et al. | |
| 2016/0201484 A1 | 7/2016 | Engel et al. | |
| 2016/0305260 A1 | 10/2016 | Freeman | |
| 2017/0146020 A1 | 5/2017 | Kray et al. | |

FOREIGN PATENT DOCUMENTS

GB    2050528 A    1/1981

* cited by examiner

*Primary Examiner* — Richard A Edgar
*Assistant Examiner* — John S Hunter, Jr.
(74) *Attorney, Agent, or Firm* — Barnes & Thornburg LLP

(57) ABSTRACT

A turbine blade is secured with a turbine disk by a retention assembly. The turbine blade includes a blade stem and the disk includes at least one mount post for mounting of the turbine blade. The retention assembly is secured with the disk by forming a diffusion joint with the disk.

18 Claims, 3 Drawing Sheets

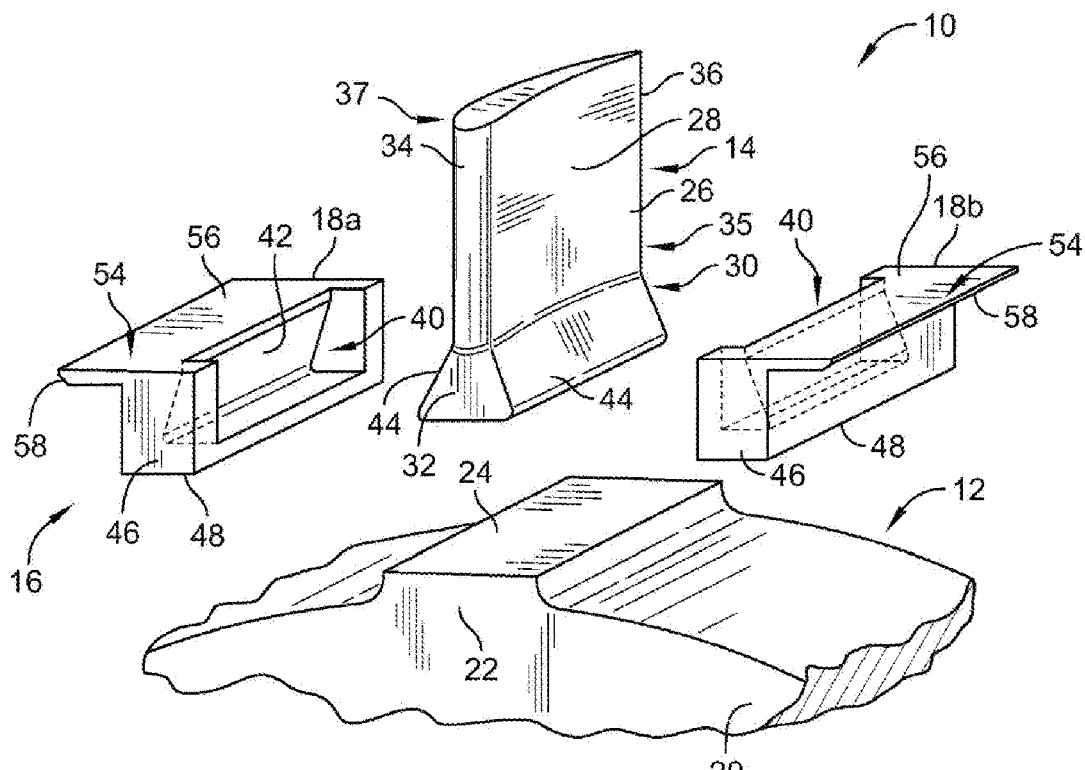
FIG. 1
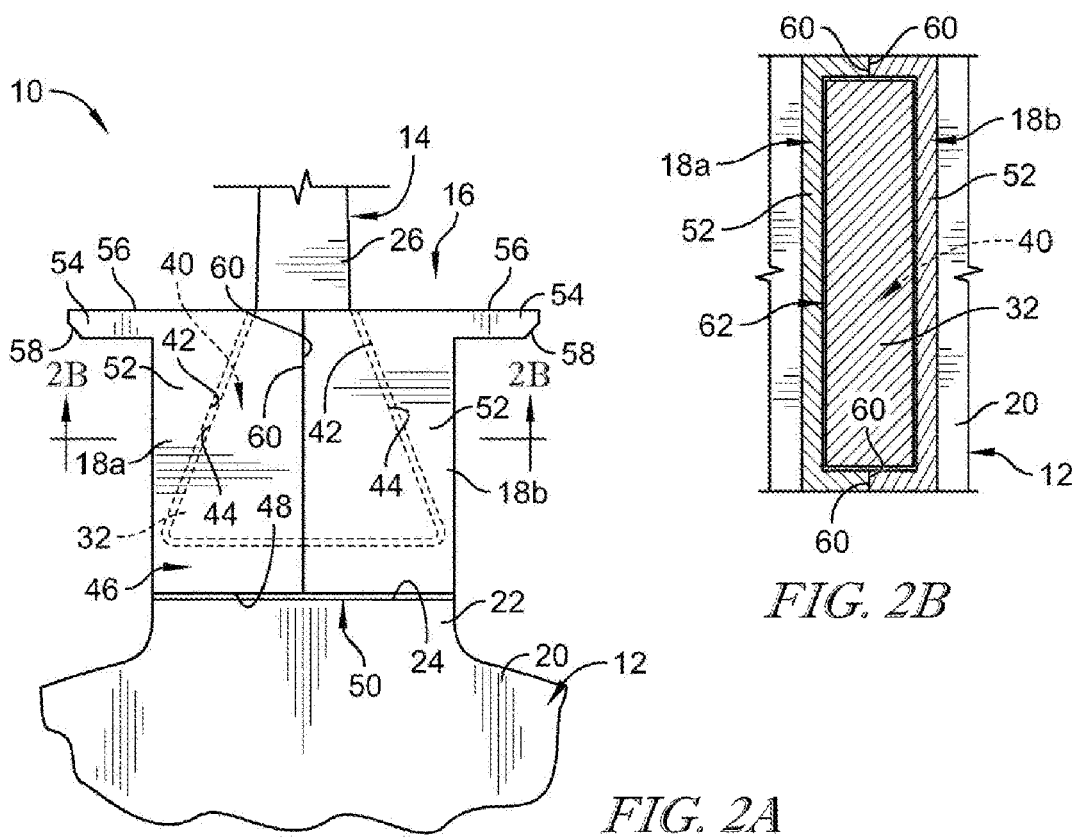
FIG. 2A
FIG. 2B

BLISK BONDED CMC AIRFOIL HAVING ATTACHMENT

BACKGROUND

The present disclosure relates generally to component for turbomachinery, and more specifically to high temperature components for turbomachinery such as gas turbine engines.

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include blades made from ceramic-matrix composite materials that are able to interact with the hot combustion products. In some turbine wheels, the blades may be coupled to a disk that supports the blades in a gas path leading out of the combustor. Coupling of the blades made from ceramic-matrix composite materials with disks, for example, metallic disks, can present design challenges.

SUMMARY

The present disclosure may comprise one or more of the following features and combinations thereof.

According to one aspect of the present disclosure, an airfoil assembly of a gas turbine engine may include at least one blade having a body formed to have an airfoil and a root having a blade stem extending from the body for securing the at least one blade, a disk including a body and at least one mount post extending radially from the body for mounting of the at least one blade, and a blade retention assembly for securing the at least one blade to the disk. The blade retention assembly may include a clamp block formed to define a stem cavity for receiving the blade stem. The clamp block may be arranged about the blade stem and joined with the at least one mount post of the disk by a diffusion joint formed between the at least one mount post and the clamp block.

In some embodiments, the clamp block may include at least two block sections. Each block section may include a clamp receptacle defined therein to collectively form the stem receptacle. The clamp block may include a mounting base for engagement with the at least one mount post to form the diffusion joint. In some embodiments, each block section may form a portion of the mounting base.

In some embodiments, each clamp receptacle may be defined at least partly by an engagement surface of the respective block section. The engagement surface may be angled to face radially inward. In some embodiments, the blade stem may include a pair of dovetail surfaces angled to face radially outward for engagement with the engagement surface of at least one of the block sections.

In some embodiments, the clamp block may include a mounting base for engagement with the at least one mount post to form the diffusion joint. At least one of the mount post and the mounting base may define a receptacle for insertion of at least a portion of the other of the mount post and the mounting base.

In some embodiments, the mount post may be formed as a protrusion extending radially from an outer surface of the disk body to define a height. The mount post may include a number of sacrificial sections constituting a portion of its radial height for removal during overhaul.

In some embodiments, the diffusion joint may include a number of diffusion-brazed bonds. At least one of the number of diffusion-brazed bonds may be radially oriented.

According to another aspect of the present disclosure, a turbine section of a gas turbine engine may include at least one blade having a body formed to have a turbine airfoil and a root having a blade stem extending from the body for securing the at least one blade; a turbine disk including a body and at least one mount post extending radially from the body for mounting of the at least one blade; and a blade retention assembly for securing the at least one blade to the turbine disk. The blade retention assembly may include a clamp block formed to define a stem cavity for receiving the blade stem. The clamp block may be arranged about the blade stem and joined with the at least one mount post of the turbine disk by a diffusion joint formed between the at least one mount post and the clamp block.

In some embodiments, the clamp block may include at least two block sections. Each block section may include a clamp receptacle defined therein to collectively form the stem receptacle. The clamp block may include a mounting base for engagement with the at least one mount post to form the diffusion joint. In some embodiments, each block section may form a portion of the mounting base.

In some embodiments, each clamp receptacle may be defined at least partly by an engagement surface of the respective block section. The engagement surface may be angled to face radially inward. In some embodiments, the blade stem may include a pair of dovetail surfaces angled to face radially outward for engagement with the engagement surface of at least one of the block sections. In some embodiments, the clamp block may include a mounting base for engagement with the at least one mount post to form the diffusion joint.

According to another aspect of the present disclosure, a method of assembling an airfoil of a gas turbine engine may include arranging a blade stem of a blade within a stem cavity of a clamp block of a retention assembly; administering a filler preform between the clamp block and a radially extending mount post of a disk; and applying heat to the clamp block, filler preform, and the mount post to form a diffusion joint between the mount post and the clamp block. In some embodiments, arranging the blade stem may include placing the blade stem in compression.

These and other features of the present disclosure will become more apparent from the following description of the illustrative embodiments.

BRIEF DESCRIPTION OF THE DRAWINGS

FIG. 1 is an exploded partial perspective view of a turbine wheel adapted for use in a gas turbine engine showing that the turbine wheel includes an airfoil assembly including a blade having an airfoil section (on top in FIG. 1) and a dovetail section (on bottom in FIG. 1), a rotor disk having a mount post, and a clamp block having two block sections which collectively define a stem cavity receiving the dovetail of the blade, the clamp block is joined with the mount post by a diffusion joint formed between the clamp block and the mount post;

FIG. 2A is a partial front elevation view of the turbine wheel of FIG. 1 unexploded and facing along the axial dimension of the turbine wheel, showing that the clamp block includes a platform and receives the dovetail of the blade to engage their correspondingly ramped surfaces, and showing that the clamp block includes a base for engagement with the mounting post to form the diffusion joint;

FIG. 2B is a diagrammatic cross-sectional view of the turbine wheel of FIG. 2A taken along the line 2B-2B showing that the clamp block encircles the blade stem, and showing that a diffusion barrier can be arranged between the blade stem and the clamp block;

DETAILED DESCRIPTION OF THE DRAWINGS

Figure 3:
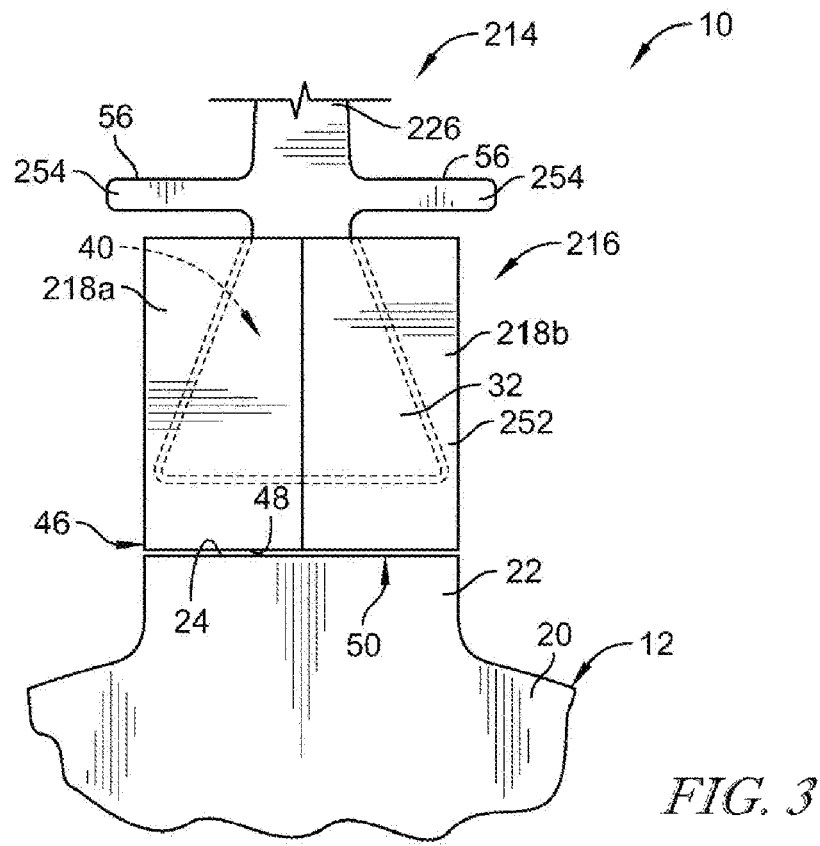
FIG. 3 is a partial front elevation view of another embodiment of the airfoil assembly of the turbine wheel of FIG. 1 unexploded and facing along the axial dimension of the turbine wheel, showing that a platform is formed on the blade.

For the purposes of promoting an understanding of the principles of the disclosure, reference will now be made to a number of illustrative embodiments illustrated in the drawings and specific language will be used to describe the same.

An illustrative turbine wheel 10 adapted for use in a gas turbine engine is shown in FIGS. 1-2B. The turbine wheel 10 includes an airfoil assembly comprising a turbine rotor disk 12 (only a portion of which is shown), a plurality of turbine blades 14 (only one of which is shown), and a plurality of blade retention assemblies 16 (only one of which is shown) for securing the blades 14 to the rotor disk 12. As discussed in additional detail below, each blade retention assembly 16 of the illustrative embodiment includes a clamp block 18a,b for engagement with each of the disk 12 and one of the blades 14.

In accordance with the present disclosure, the turbine blades 14 are attached to the rotor disk 12 for rotation with the rotor disk 12 about a rotational axis of the gas turbine engine, generally a central axis thereof. The blade retention assemblies 16 capture a portion of each blade 14 and are affixed with the disk 12 by a diffusion joint 50 (as best shown in FIG. 2A). A geometric connection, illustratively formed as a dovetail connection, between the blade retention assemblies 16 and their respective blades 14 can allow particular design advantages. For example, the geometric connection provides advantages in materials selection while permitting affixation of the retention assemblies 16 with the disk 12 with a diffusion joint 50. In some embodiments, any suitable geometric connection may be used, including but without limitation, parallel planes held under compression or non-planar and/or curved attachment stem.

Each blade 14 of the illustrative embodiment includes a ceramic-matrix composite (CMC) material. CMC materials can assist in reducing the weight of the assembly while providing good resistance to high temperatures of the combustion products discharged onto the blade 14. The blades 14 illustratively comprise silicon-carbide reinforcements suspended in silicon-carbide matrix material. In other embodiments, other reinforcements and other ceramic-containing matrix materials may be included in the blades 14.

The rotor disk 12 is illustratively formed from a metallic superalloy (e.g. Inconel, Waspalloy, etc.) while the retention assemblies 16 are illustratively formed of a single crystal, or other braze capable, high temperature alloy. Securing the retention assemblies 16 with the disk 12 by forming a diffusion joint 50 can provide a low weight, compact arrangement, can reduce blade stress and/or allow alignment of blade stresses with the strengths of the underlying CMC architecture, and/or can provide spatial advantages in a condensed area.

As shown in FIG. 1, the rotor disk 12 illustratively includes a disk body 20 generally circular (cylindrical) about the central (rotational) axis and a mount post 22 extending radially from the body 20 for connection with the corresponding retention assembly 16. Each mount post 22 includes a bonding surface 24 for engagement with the retention assembly 16. The engagement of the bonding surface 24 and the retention assembly 16 may include a filler preform received therebetween. Heating the components with the filler preform to process temperatures bonds the mount post 22 and retention assembly 16 together with a diffusion joint 50 (shown in FIG. 2A) to secure the blade 14 with the disk 12.

Each blade 14 includes a body 26 forming an airfoil 28 for receiving combustion products to drive the turbine and a root 30 for connection with the disk 12. The airfoil 28 is illustratively shown having a basic tapered contour extending from leading edge 34 to trailing edge 36, defining pressure 35 and suction sides 37, but may have any number of airfoil geometries to support turbine operation. The root 30 includes a stem 32 extending from the body 26 for engagement with the retention assembly 16.

As shown in FIG. 2A, each retention assembly 16 includes a clamp block 18a,b defining a cavity 40 for receiving the blade stem 32. In the illustratively embodiment, the stem cavity 40 is defined collectively by block sections 18a and 18b comprising the clamp block, each block section 18a, 18b defining a portion of the stem cavity 40. The stem 32 and the cavity 40 are formed complimentary to each other, illustratively as dovetail components, although in some embodiments, the stem 32 and the cavity 40 may include other geometric arrangements. Each block section 18a, 18b illustratively includes an engagement surface 42 angled to face radially inward for engagement with at least one radially outward facing surface 44 of the blade stem 32. The surfaces 42, 44 are formed complimentary to each other and although shown with slight spacing for descriptive purposes, the complimentary surfaces 42,44 are engaged with each other for mechanical locking (wedged clamping) at least during rotation of the turbine wheel by centrifugal (centripetal) forces. Securing the blade 14 with the retention assembly 16 permits indirect attachment of the blade 14 with the disk 12.

The clamp block 18a,b of the retention assembly 16 includes a base 46 for engagement with the disk 12. The base 46 includes a bond surface 48 for engagement with the bond surface 24 of the disk 12 to form the diffusion joint 50. Although in FIG. 2A, the bond surfaces 24, 48 are shown distinctly, formation of the diffusion joint 50 illustratively joins the retention assembly 16 with the disk 12 and may result in blending of the bond surfaces 24, 48 within the diffusion joint 50 itself. Prior to heating the components with the filler preform up to process temperatures to form the diffusion joint 50, the filler preform may be applied between the surfaces 24, 48 and is simultaneous represented by numeral 50 in FIG. 2A to join the disk 12 and the clamp block 18*a,b*.

The clamp block 18*a,b* includes walls 52 extending radially from the base 46. The walls 52 define the stem cavity 40 therein. Forms 54 extend laterally (circumferentially and axially) from the walls 52 to from a platform having a flow path surface 56 for guiding combustion products to interact with the blades 14. The forms 54 each include a beveled end 58 on their lateral end on the underside corner. The beveled ends 58 can engage with dampers arranged between the platforms of other adjacent airfoil assemblies to reduce the impacts of vibration.

Referring to FIG. 2B, as shown in cross-section, the walls 52 surround the blade stem 32. Inner portions 60 of the walls 52 abut each other to enclose the stem cavity 40. An isolation barrier 62 is illustratively applied between the blade stem 32 and the clamp block 18*a,b* to inhibit bonding between the two. The isolation barrier 62 may be formed as an anti-diffusion layer obstructing diffusion reaction during heating to process temperatures.

As shown in FIG. 3, another illustrative embodiment of an airfoil assembly of the turbine wheel 10 includes a blade 214 secured with the rotor disk 12 by a retention assembly 216 having a clamp block 218*a,b*. The clamp block 218*a,b* defines the stem cavity 40 and engages the mount post 22 with the filler preform to form the diffusion joint 50 upon heating to process temperatures. The disclosure of the blade 14 and retention assembly 16 applies equally to the blade 214 and the retention assembly 216, except when in conflict with the specific disclosure of the blade 214 and the retention assembly 216.

Unlike the clamp block 18*a,b*, the walls 252 of the clamp block 218*a,b* do not include forms 54, and instead the blade body 226 includes forms 254 projecting therefrom to form flow path surface 56. Incorporation of the forms on either the blade body and/or the clamp block may apply to any of the embodiments disclosed herein above or below.

Figure 4:
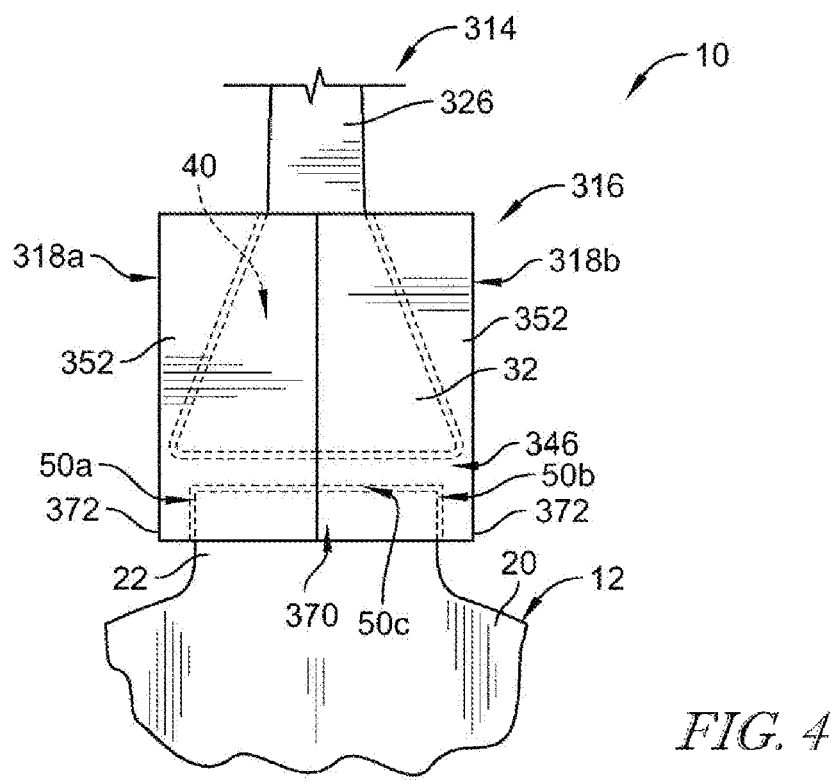
FIG. 4 is a partial front elevation view of another embodiment of the airfoil assembly of the turbine wheel of FIG. 1 unexploded and facing along the axial dimension of the turbine wheel, showing that the base of the clamp block is formed to include a receptacle in which the mount post is inserted, and showing that the diffusion joint includes diffusion bonds that are oriented radially (vertically in FIG. 4)

Referring now to FIG. 4, another illustrative embodiment of an airfoil assembly of the turbine wheel 10 includes a blade 314 having a blade body 326 and secured with the rotor disk 12 by a retention assembly 316 having a clamp block 318 *a,b*. The disclosure of the blade 14, 214, and retention assembly 16, 216 applies equally to the blade 314 and the retention assembly 316, except when in conflict with the specific disclosure of the blade 314 and the retention assembly 316. Unlike the previous embodiments, the base 346 of the clamp block 318 *a,b* includes a receptacle 370 defined therein for receiving a portion of the mount post 22 of the disk 12. In the illustrative embodiment, the mount post 22 is formed to have the same dimensions as other mount posts 22 while the size of the clamp block 318 *a,b* is formed to define the receptacle 370 to accommodate the width (horizontal width as shown in FIG. 4) of the mount post 22. In some embodiments, the sizes of mount post 22 and the receptacle may include any suitable complimentary dimensions.

The receptacle 370 is illustratively defined by footers 372 extending radially inward from the walls 352 of the clamp block 318*a,b*. In the illustrative embodiment, the diffusion joint 50 is formed to include radial (vertical) portions 50*a,b* in addition to lateral (horizontal) portion 50*c*. The radial orientation of the portions 50*a,b* can provide joint alignment with radial forces acting on the airfoil assembly.

Figure 5:
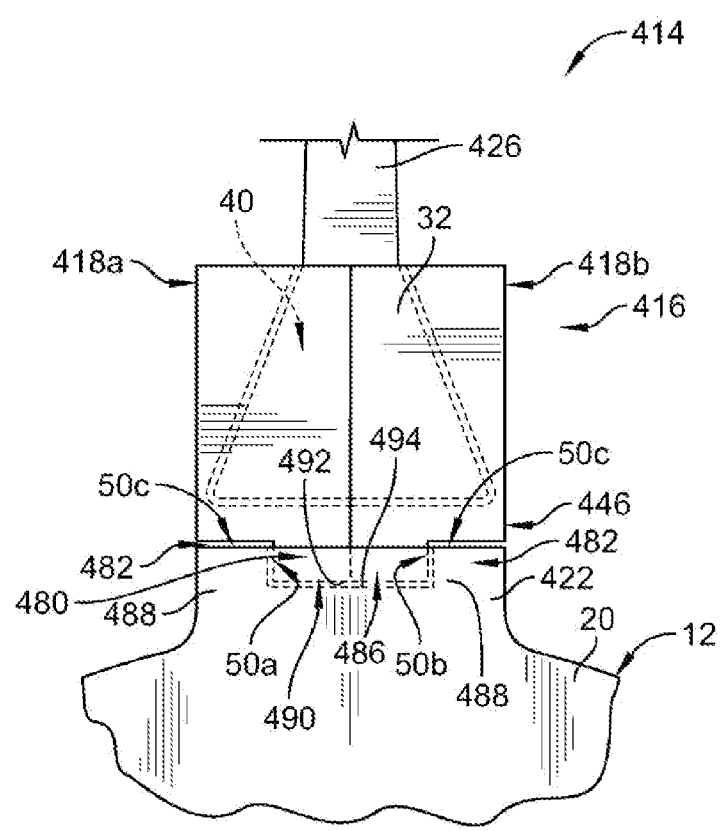
FIG. 5 is a partial front elevation view of another embodiment of the airfoil assembly of the turbine wheel of FIG. 1 unexploded and facing along the axial dimension of the turbine wheel, showing that the base of the clamp block is formed to include receptacles in which portions of the mount post is inserted, and the mount post includes a receptacle in which a portion of the clamp block is inserted, and showing that a gap is defined between the portion of the clamp block and the mount post.

Referring now to FIG. 5, another illustrative embodiment of an airfoil assembly of the turbine wheel 10 includes a blade 414 including a blade body 426 and secured with the rotor disk 12 by a retention assembly 416 having a clamp block 418 *a,b*. The disclosure of the blade 14, 214, 314 and retention assembly 16, 216, 316 applies equally to the blade 414 and the retention assembly 416, except when in conflict with the specific disclosure of the blade 414 and the retention assembly 416. Unlike the previous embodiments, the base 446 of the clamp block 318 *a,b* includes a protrusion 480 formed collectively by the block sections 418 *a*, 418 *b*.

The protrusion 480 illustratively projects radially inward from the lower end of the clamp block 418 *a,b* and defines a receptacle 482 on either circumferential side thereof. The mount post 422 illustratively includes a receptacle 486 defined therein for receiving the protrusion 480. The receptacle 486 is defined partly by mount protrusions 488 that are formed complimentary for reception within the respective receptacle 482. The diffusion joint 50 is formed to include radial (vertical) portions 50 *a*, *b* in addition to lateral (horizontal) portions 50*c*. A gap 490 is formed between an engagement surface 492 of the protrusion 480 and an upper (radial) surface 494 defining the receptacle 486 of the mount post 422. Accordingly, a stepped engagement can be formed between the clamp block 418 *a,b* and the mount post 422.

In some embodiments, the blade retention assemblies 16, 216, 316, 416 may include a metallic material and may comprise an alloy which may be cobalt-, nickel- or iron-based and may be alloyed with manganese, chromium, silicon, cobalt, tungsten, tantalum, aluminum, titanium, hafnium, rhenium, molybdenum, nickel, iron, boron, vanadium, carbon, and/or yttrium. In some embodiments the blade retention assembly may comprise a ceramic or composite material in place of a metal or metal alloy.

The turbine blades experience centrifugal forces during operation (rotation about the central axis) of the gas turbine engine. The forces can pull the blades radially outward and encourage the engagement surfaces of the blade stem and stem cavity to engage each other providing a wedge effect. The wedge effect can allow a gripping force to be applied to the root.

The present disclosure includes devices, systems, and methods for turbomachinery improvements. Increases in turbomachinery cycle efficiency and power density may also increase the combustor outlet temperatures. Incorporation of CMC components, capable of withstanding high temperatures, into the turbine section offer the potential of reducing cooling air requirements due to their higher temperature capability and reducing engine weight due to their low density. CMC turbine blades with a metallic attachment bonded to a metallic disk can take advantage of these high temperature materials.

In the present disclosure, a CMC blade with a very high flank angle attachment may be sandwiched between two pieces of metal, with the metallic piece wrapping around the hub of the attachment, and then the assembly may be "attached" to the outer diameter of the disk by means of brazing, diffusion brazing, linear friction welding, or diffusion bonding. The metallic pieces that encapsulate the attachment can be joined by means of diffusion brazing or diffusion bonding, to form a diffusion joint. In some embodiments, the components may be formed in such a way as to put the CMC attachment in compression under all operating (rotating) conditions of the turbine wheel. In some embodiments, the CMC attachment could have near, or fully parallel sides, but but in some other embodiments, may have a shallow angle dovetail to provide mechanical locking relative to the centrifugal forces applied by rotation.

In some embodiments, a platform may included as part of the bonded metallic pieces. The platform may be machined after the attachment has been encapsulated but prior to bonding the blade assembly to the disk. The platform can act as a flowpath surface and may include effusion holes as determined by heat transfer analysis. The platform may have features to hold/contain/support/retain/react vibration dampers.

The disk may have posts that protrude radially outward from the live rim of the disk. These posts may be the locations where the blade assemblies are attached. These posts can enable attaching the blades in a location that is not under significant circumferential stress such as exists in the live rim. The posts may be sized such that they can be shortened multiple times to account for blades needing to be removed and replaced. Depending upon the attachment method, it may be possible that the bond line will become contaminated with braze alloy or the base material of the metal surrounding the attachment and thus cause an inferior joint in subsequent repairs. Note that the metallic attachment of the blade may need to be formed longer for repair joints than for an initial build. In some embodiments, it may be possible that a single length attachment (of the blade) be formed and then the attachment be machined to the appropriate length depending on the requirement of new, repair 1, repair 2, etc.

In some embodiments, the blade platform may be formed integrally with the CMC blade. In such embodiments, the features for retaining the damper may be included in the CMC platform.

In some embodiments, attachment of the blade assembly slips over the disk post. A diffusion brazed surface would include the vertical faces of the disk post (either lateral side faces and/or forward and/or aft faces) and the top face of the post. This allows for at least some of the braze joint (those on the vertical faces) to be in shear. In some embodiments, the vertical faces are reversed with the blade assembly forming a radially inboard feature that is positioned by the disk post. In such embodiments, the shoulders and vertical faces may be joined while a gap is formed between the bottom face of the blade assembly and the disk post. In other embodiments, the gap may be filled with a wide gap braze, dependent upon machining tolerances and the propensity of the wide gap braze to contaminate the diffusion braze joints.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An airfoil assembly of a gas turbine engine, the airfoil assembly comprising:
    at least one blade including a blade body formed to have an airfoil and a root having a blade stem extending from the blade body for securing the at least one blade;
    a disk including a disk body and at least one mount post extending radially from the disk body for mounting of the at least one blade; and
    a blade retention assembly for securing the at least one blade to the disk, the blade retention assembly including a clamp block formed to define a stem cavity for receiving the blade stem, the clamp block being arranged about the blade stem and joined with the at least one mount post of the disk by a diffusion joint formed between the at least one mount post and the clamp block, the at least one mount post including a radially outermost surface for engagement with a radially inward facing bottom surface of the clamp block,
    wherein the radially inward facing bottom surface of the clamp bock defines an axial-circumferential plane that extends in an axial direction and in a circumferential direction,
    wherein the clamp block includes a mounting base including the radially inward facing bottom surface for engagement with the radially outermost surface of the at least one mount post to form the diffusion joint, the radially inward facing bottom surface of the clamp block including at least a portion that extends continuously from an axially foremost edge of the clamp block to an axially aftmost edge of the clamp block in the axial-circumferential plane, and
    wherein the clamp block includes a first form extending circumferentially away from a first circumferentially-facing outer sidewall of the clamp block and a second form extending circumferentially away from a second circumferentially-facing outer sidewall opposite the first circumferentially-facing outer sidewall, the first form and the second form defining a flow path surface, and each of the first form and the second form including a beveled end on an underside corner of a lateral end of the form.

2. The airfoil assembly of claim 1, wherein the clamp block includes at least two block sections, each block section including a clamp receptacle defined in the block section to collectively form the stem cavity.

3. The airfoil assembly of claim 2, wherein each clamp receptacle is defined at least partly by an engagement surface, the engagement surface angled to face radially inward.

4. The airfoil assembly of claim 3, wherein the blade stem includes a pair of dovetail surfaces angled to face radially outward for engagement with the engagement surface of at least one of the block sections.

5. The airfoil assembly of claim 3, wherein each engagement surface extends continuously from an axially foremost edge of the clamp receptacle to an axially aftmost edge of the clamp receptacle.

6. The airfoil assembly of claim 1, wherein each block section forms a portion of the mounting base.

7. The airfoil assembly of claim 1, wherein one of the at least one mount post and the mounting base defines a receptacle for insertion of at least a portion of the other of the at least one mount post and the mounting base.

8. The airfoil assembly of claim 1, wherein the at least one mount post is formed as a protrusion extending radially from an outer surface of the disk body to define a height.

9. The airfoil assembly of claim 1, wherein the diffusion joint includes a number of diffusion-brazed bonds.

10. The airfoil assembly of claim 9, wherein at least one of the number of diffusion-brazed bonds is radially oriented.

11. The airfoil assembly of claim 1, wherein the stem cavity defines a radially inwardmost cavity bottom surface that extends continuously from an axially foremost edge of the stem cavity to an axially aftmost edge of the stem cavity in a second plane that is parallel to the axial-circumferential plane.

12. The airfoil assembly of claim 11, wherein the at least one blade defines a radially inwardmost blade bottom surface that extends continuously from an axially foremost edge of the at least one blade to an axially aftmost edge of the at least one blade in a third plane that is parallel to the axial-circumferential plane.

13. A turbine section of a gas turbine engine, the turbine section comprising:
   at least one blade including a blade body formed to have a turbine airfoil and a root having a blade stem extending from the blade body for securing the at least one blade;
   a turbine disk including a disk body and at least one mount post extending radially from the disk body for mounting of the at least one blade; and
   a blade retention assembly for securing the at least one blade to the turbine disk, the blade retention assembly including a clamp block formed to define a stem cavity for receiving the blade stem, the clamp block being arranged about the blade stem and joined with the at least one mount post of the turbine disk by a diffusion joint formed between the at least one mount post and the clamp block, the at least one mount post including a radially outermost surface for engagement with a radially inward facing bottom surface of the clamp block,
   wherein the radially inward facing bottom surface of the clamp bock defines an axial-circumferential plane that extends in an axial direction and in a circumferential direction,
   wherein the clamp block includes a mounting base including the radially inward facing bottom surface for engagement with the radially outermost surface of the at least one mount post to form the diffusion joint, the radially inward facing bottom surface of the clamp block including at least a portion that extends continuously from an axially foremost edge of the clamp block to an axially aftmost edge of the clamp block in the axial-circumferential plane,
   wherein the clamp block includes at least two block sections, each block section including a clamp receptacle defined in the block section to collectively form the stem receptacle, each clamp receptacle is defined by a generally circumferentially-facing surface, a first axially-facing surface, and a second axially-facing surface opposite the first axially-facing surface, and
   wherein an isolation barrier is disposed between an outer surface of the blade stem and each of the first axially-facing surface, the second axially-facing surface, and the generally circumferentially-facing surface of each clamp receptacle; the isolation barrier being an anti-diffusion layer configured to obstruct diffusion bonding between the outer surface of the blade stem and the clamp receptacles.

14. The turbine section of claim 13, wherein each block section forms a portion of the mounting base.

15. The turbine section of claim 13, wherein the generally circumferentially-facing surface of each clamp receptacle is an engagement surface, the engagement surface angled to face radially inward.

16. The turbine section of claim 15, wherein the blade stem includes a pair of dovetail surfaces angled to face radially outward for engagement with the engagement surface of at least one of the block sections.

17. The turbine section of claim 13, wherein the at least one mount post is formed as a protrusion extending radially from an outer surface of the disk body to define a height.

18. A method of assembling an airfoil of a gas turbine engine, the method comprising:
   arranging a blade stem of a blade within a stem cavity of a clamp block of a retention assembly, the clamp block including a protrusion extending radially inwardly away from a bottom surface of the clamp block, the clamp block having a first bottom surface portion and a second bottom surface portion on opposing circumferential sides of the protrusion, the protrusion including a bottom protrusion surface and two opposing circumferentially-facing outer surfaces;
   administering a filler preform between the clamp block and a radially extending mount post of a disk, the radially extending mount post including a radially outermost surface and a receptacle formed in the mount post and extending radially inwardly away from the radially outermost surface, the radially extending mount post having a first top surface portion and a second top surface portion on opposing circumferential sides of the receptacle, the receptacle including a bottom receptacle surface and two opposing circumferentially-facing inner surfaces, the receptacle configured to receive the protrusion of the clamp block, wherein the filler preform is administered between the first top surface portion of the radially extending mount post and the first bottom surface portion of the clamp block, between the second top surface portion of the radially extending mount post and the second bottom surface portion of the clamp block, and between the two opposing circumferentially-facing inner surfaces of the receptacle and the two opposing circumferentially-facing outer surfaces of the protrusion, and wherein the filler preform is not administered between the bottom receptacle surface and the bottom protrusion surface; and
   applying heat to the clamp block, the filler preform, and the mount post to form a diffusion joint between the first top surface portion of the radially extending mount post and the first bottom surface portion of the clamp block, between the second top surface portion of the radially extending mount post and the second bottom surface portion of the clamp block, and between the two opposing circumferentially-facing inner surfaces of the receptacle and the two opposing circumferentially-facing outer surfaces of the protrusion.

* * * * *